United States Patent [19]
Hattori et al.

[11] Patent Number: 5,967,964
[45] Date of Patent: Oct. 19, 1999

[54] AQUEOUS DISPERSION SLURRY OF INORGANIC PARTICLES AND PRODUCTION METHODS THEREOF

[75] Inventors: Masayuki Hattori, Aichi-ken; Nobuyuki Ito, Yokkaichi, both of Japan

[73] Assignee: JSR Corporation, Tokyo, Japan

[21] Appl. No.: 09/072,666

[22] Filed: May 5, 1998

[30] Foreign Application Priority Data

| May 7, 1997 | [JP] | Japan | 9-132881 |
| Jul. 23, 1997 | [JP] | Japan | 9-214035 |
| Aug. 19, 1997 | [JP] | Japan | 9-238969 |

[51] Int. Cl.$^6$ .................................. B01J 13/00
[52] U.S. Cl. .................. 516/81; 241/16; 366/287; 366/288; 516/86; 516/89; 516/90; 516/93; 516/922; 516/929
[58] Field of Search ............... 241/16; 366/287, 366/288; 516/86, 89, 90, 93, 922, 929, 81

[56] References Cited

U.S. PATENT DOCUMENTS

| 2,984,629 | 5/1961 | Loftman et al. | 516/86 |
| 3,455,718 | 7/1969 | Dithmar et al. | 516/93 X |
| 3,460,957 | 8/1969 | Giovanetti et al. | 241/16 X |
| 4,691,867 | 9/1987 | Iwako et al. | 241/21 |
| 4,989,794 | 2/1991 | Askew et al. | 241/16 |
| 5,116,535 | 5/1992 | Cochrane | 252/313.2 |
| 5,524,982 | 6/1996 | Kruse et al. | 366/288 X |

FOREIGN PATENT DOCUMENTS

| 0766 997 | 4/1997 | European Pat. Off. . |
| 3-50112 | 3/1991 | Japan . |
| 9-142827 | 6/1997 | Japan . |
| 9-193004 | 7/1997 | Japan . |
| 2 063 695 | 6/1981 | United Kingdom . |

OTHER PUBLICATIONS

Catalog of Nippon Aerosi lCo., Ltd., No. 19, pp. 38 and 39 and front and back cover of the Catalog of Nippon Aerosil Co., Ltd., "Technical Bulletin Aerosil" Mar. 1994.

*Primary Examiner*—Richard D. Lovering
*Attorney, Agent, or Firm*—Oblon, Spivak, McClelland, Maier & Neustadt, P.C.

[57] ABSTRACT

The present invention provides production methods for aqueous dispersion slurry of inorganic particles which are so stable as not to increase in viscosity, gel or sediment even if stored for a long time and whose average particle diameter is 0.01 to 2 $\mu$m. As such production method, 2 production methods are available:

A production method (A) having a preliminary dispersion process in which the inorganic particles are added to ad dispersed in an aqueous medium and a main dispersion process in which dispersed slurry out of the preliminary dispersion process are collided with each other under a pressure of 100 to 3,000 kg/cm$^2$; and A production method (B) in which the inorganic particles are added to an aqueous medium within a kneading tank of a kneader in which mixing blades rotate around respective subsidiary spindles and the subsidiary spindles revolves around a spindle and dispersed at a solid concentration of 30 to 70 wt %.

8 Claims, 2 Drawing Sheets

AQUEOUS DISPERSION SLURRY OF INORGANIC PARTICLES AND PRODUCTION METHODS THEREOF

FIELD OF THE INVENTION

This invention generally relates to aqueous dispersion slurry of inorganic particles and production methods thereof. Aqueous dispersion slurry produced by production methods according to this invention are free from such problems as increase in viscosity, gelation and separation/sedimentation during storage, i.e., highly stable. For this reason, such aqueous colloidal dispersion slurry may be suitably used, for example, as raw materials for cosmetics, paint, coating materials and polishing slurry for semiconductor wafers.

BACKGROUND OF THE INVENTION

As raw materials for cosmetics, paint, coating materials and polishing slurry for semiconductor wafers, raw materials of high purity with a minimal concentration of impurities, such as inorganic particles synthesized by a vapor phase method, such as fumigation, (hereinafter referred to as "vapor phased inorganic particles") have been used. However, as the vapor phased inorganic particles are intensive in secondary coagulation, when the vapor phased inorganic particles are dispersed in the water, coagula of such vapor phased inorganic particles should be destroyed and fused in the water. If the coagula are not completely destroyed or fused, problems, such as increase in viscosity of the aqueous dispersion slurry as the time passes, gelation and consequent loss of fluidity, and sedimentation and separation of the coagula. As a result, the aqueous dispersion slurry of inorganic particles can no longer be applied to those uses as described above.

As a method of dispersing the vapor phased inorganic particles in an aqueous medium, a method using dispersion equipment of high-speed mixing type (e.g., whirling blender, and high shearing mixer) as disclosed in U.S. Pat. No. 5,116,535 (Japanese Unexamined Patent Publication No. 3-50112) has been known. Also, a method using equipment combining a powder introduction type mixer/disperser (e.g., jet stream mixer) with a toothed colloid mill, a dissolver or a skim mixer (Nippon Aerosil Co., Ltd.; Catalog No. 19: How to Handle Aerosil, p. 38) has also been known. However, both of these methods are disadvantageous in that a long-time processing is required and that vapor phased inorganic particles can not be completely destroyed or fused.

As regards the method of dispersing pulverized silica or fumed silica in an aqueous medium, a method of pulverizing and dispersing the vapor phased inorganic particles using a high-pressure homogenizer to 100 nm or less in average secondary particle diameter has been disclosed in the Japanese Unexamined Patent Publication No. 9-142827 (opened on Jun. 3, 1997) and in the Japanese Unexamined Patent Publication No. 9-193004 (opened on Jul. 29, 1997), which were opened after the date of application of the Japanese Patent Application No. 9-132881 over which the present invention claims priority. However, these publications contain no description of the dispersion of inorganic particles other than the pulverized silica and the fumed silica.

Under these circumstances, development of a method of producing the aqueous dispersion slurry of various inorganic particles has been wanted.

SUMMARY OF THE INVENTION

It is a primary object of the present invention to provide aqueous dispersion slurry of inorganic particles of 0.01 to 2 $\mu$m in average diameter which are highly stable with no increase in viscosity, no gelation or no sedimentation even if stored for a long time, and production methods of such aqueous dispersion slurry of inorganic particles. As such production methods, the following 2 production methods, (A) and (B), are available:

1. PRODUCTION METHOD (A)

The production method (A) is characterized by performing a preliminary dispersion process in which inorganic particles are added to and dispersed in an aqueous medium and a main dispersion process in which the dispersed slurry out of the preliminary dispersion process are collided against each other or against walls of a disperser under a pressure of 100 to 3,000 kg/cm$^2$.

In the production method (A), preferably, the dispersion slurry out of the main dispersion process should be quickly placed under a normal pressure, and more preferably, the dispersion slurry should be quickly placed under a normal pressure by flowing the same dispersion slurry at a high speed.

In the preliminary dispersion process, preferably the inorganic particles should be 3 to 70 wt % in concentration in which the inorganic particles are suitable for the production of aqueous dispersion slurry. More preferably, the concentration of the inorganic particles should be 4 to 60 wt %. If the concentration of the inorganic particles in the preliminary process is Less than 3 wt %, the dispersion efficiency will drop to such an extent that the obtained aqueous dispersion slurry of inorganic particles may quickly become unstable. On the other hand, if the concentration of the inorganic particles in the preliminary process exceeds 70 wt %, the inorganic particles may not be sufficiently wet due to too small water content, or the viscosity of dispersing liquid may excessively increase or the inorganic particles may be gelled and become less fluid.

The main dispersion process (i.e., collision process) can be performed by using a high-pressure homogenizer which allows the dispersion slurry out of the preliminary dispersion process to be guided through a plurality of pipes and then joined with each other. FIG. 1(a) shows a concept of the high-pressure homogenizer which guides the dispersion slurry out of the preliminary process through 2 pcs of pipes 51 and 52, collides the dispersion slurry out of the pipes 51 and 52 against each other under the foregoing pressure, and then feeds the dispersion slurry through a drain pipe 30 at a high speed, branches the dispersion slurry into 2 pcs of branch pipes 61 and 62, and then collects the dispersion slurry into a collection tank (not illustrated). FIG. 1(b) shows an example in which the dispersed slurry out of the preliminary dispersion process are guided from a main pipe 50a into 2 pcs of branch pipes 51a and 52a branched from the main pipe 51a, collides the dispersion slurry out of the branch pipes 51a and 52a against each other, and then upwardly discharges the dispersed slurry.

In these examples, the aqueous dispersion slurry out of the preliminary dispersion process collide against each other. Here, the main dispersion process may be performed by having the dispersion slurry out the preliminary dispersion process collided against pipe walls instead of having the dispersion slurry out of the preliminary dispersion process collided against each other.

To quickly place the dispersion slurry after collision under a normal pressure, only what to do is to have the dispersion slurry flow at a fast speed from the collision position into a sufficiently large container.

2. PRODUCTION METHOD (B)

The production method (B) is a production method for the aqueous dispersion slurry of inorganic particles which is characterized by that inorganic particles are added to an aqueous medium within a kneading tank of a kneader in which a mixture of the inorganic particles and the aqueous medium is to be kneaded by rotation of mixing blades around respective subsidiary spindles and revolution of the subsidiary spindles around a spindle, and the inorganic particles are dispersed through such kneading at a solid concentration of 30 to 70 wt %.

Here, the kneader in which mixing blades rotate around respective subsidiary spindles and the subsidiary spindles revolve around a spindle is generally called "a planetary kneader."

In the production method (B), the concentration of the inorganic particles in dispersion in an aqueous medium should be 30 to 70 wt %, preferably be 35 to 60 wt %, and more preferably be 40 to 50 wt %. If the solid concentration of the inorganic particles is less than 30 wt %, the dispersion efficiency will drop to such an extent that coagula may be left in the obtained aqueous dispersion slurry, and as a result, such coagula may sediment and separate during storage or gel due to increase in viscosity. On the other hand, if the solid concentration of the inorganic particles exceeds 70 wt %, load on the disperser will become too large to maintain mixing in motion. If mixing is forced in such state, the inorganic particles may be excessively dispersed, and as a result, a large quantity of coarse particles of 10 $\mu$m or more in particle diameter may be produced due to re-coagulation.

In the production method (B), it is preferable that the inorganic particles should be dispersed in an aqueous medium while continuously and intermittently added. If the inorganic particles are added in a required quantity at a time in the beginning, there will be problems that it is difficult to uniformly disperse the inorganic particles and the mixer may be stopped by an excessively large load. As an ideal method of adding the inorganic particles, it is preferable that the inorganic particles should be quickly added until the solid concentration reaches approx. 20 wt % and then continuously and intermittently added while monitoring current value of (load on) the kneader not to be too large. As a hopper for supplying the inorganic particles, a screw transfer type or the like may be named.

Preferably, the aqueous dispersion slurry out of the dispersion process in the production method (B) should be diluted after the kneading process. The extent of such dilution depends on the type of the dispersed inorganic particles or the solid concentration in the kneading process. Preferably, the solid concentration should be decreased by 5 wt % or more down from the solid concentration in the kneading process. If the solid concentration in the kneading process is maintained, as this solid concentration is too high, the inorganic particles are not only difficult to be processed but also may quickly gel due to increase in viscosity during storage.

As a dilution method, additionally applying an aqueous medium directly into the kneader is preferable as this way of dilution makes it easy to remove the dispersion slurry from the kneader.

In the production method (B), it is possible to perform the dispersion processing by using another kneader or disperser after the kneading process to improve the uniformity. In this case, for example, corres type high-speed mixer/disperser, homo-mixer, high-pressure homogenizer or bead mill can preferably be used for this purpose.

BRIEF DESCRIPTION OF THE DRAWINGS

FIG. 1(a) is a descriptive view showing a principle of a high-pressure homogenizer, while FIG. 2 is a schematic view showing a planetary kneader, wherein

DETAILED DESCRIPTION OF THE INVENTION

Figure 1A:
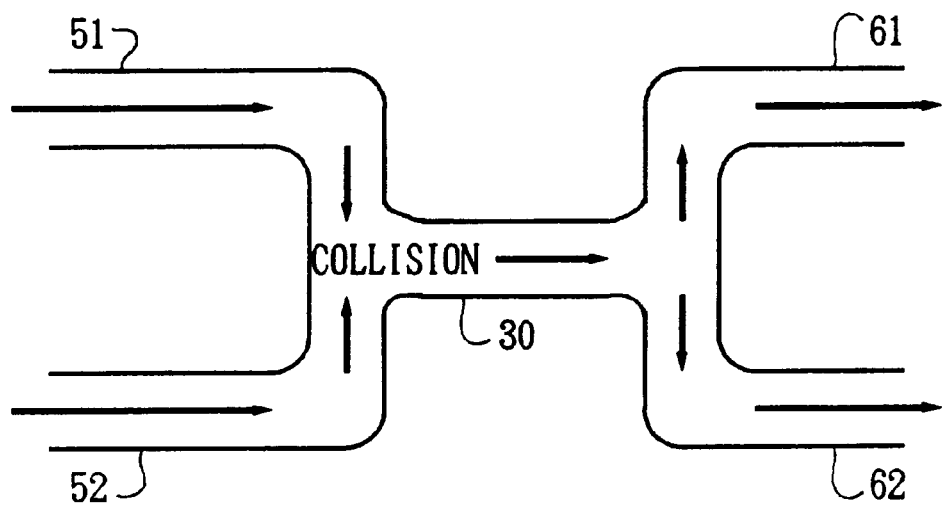
Figure 1B:
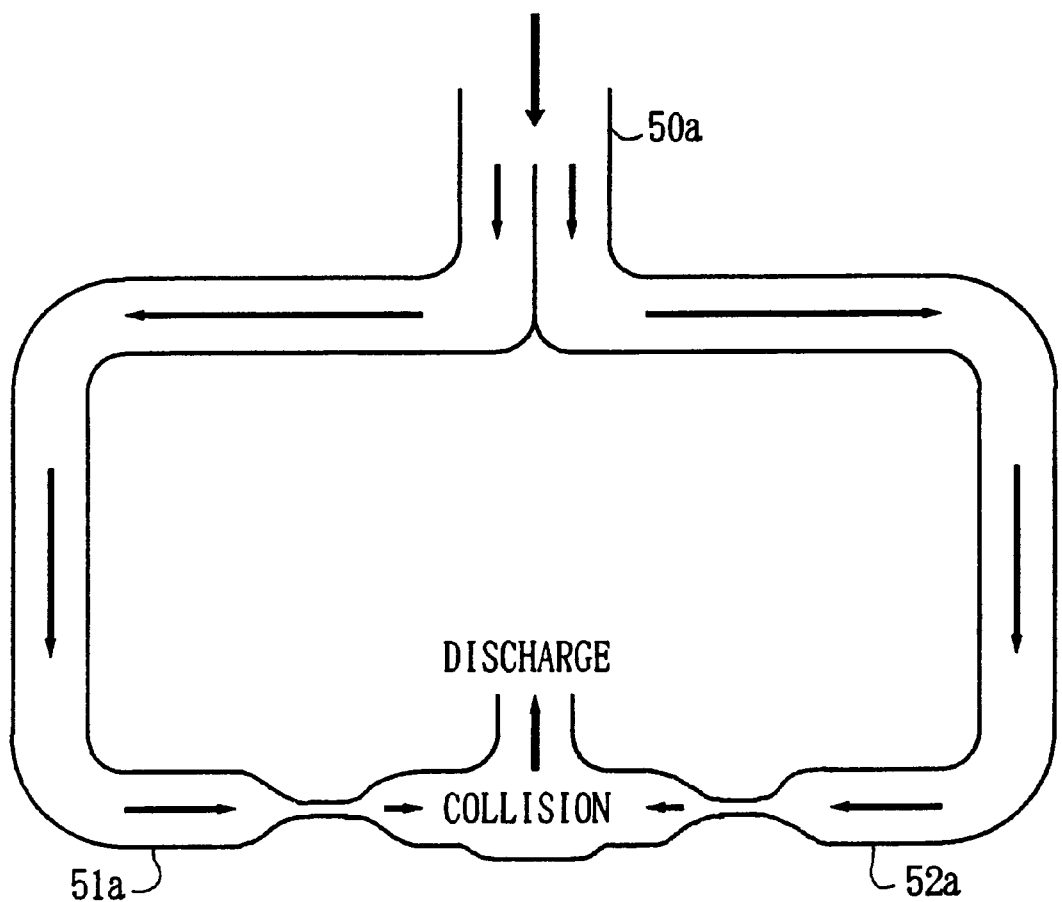
FIG. 1(b) is a descriptive view showing a principle of a high-pressure homogenizer which is different from that of FIG. 1(a)

Now, the present invention will be described in detail.

1. INORGANIC PARTICLES

As a production method of the inorganic particles used in production methods (A) and (B) according to the present invention, such as a vapor phase method, a wet method and a sol gel method may be named. As the vapor phase method, a fumed method (high-humidity flame hydrolysis method), and a Nanophase Technologies Corporation method (metal evaporation and oxidation method) may be named. Furthermore, a production method in which natural inorganic compounds are pulverized, refined and/or classified can be named. Preferably, the inorganic particles should be produced by the vapor phase method, and more preferably, by the fumed method. The inorganic particles produced by the vapor phase method are highly purified and therefore favorable. The inorganic particles produced by the fumed method are highly purified and also comparatively economical and therefore particularly favorable.

As the inorganic particles preferably used in production methods (A) or (B), metallic oxides may be exemplified, such as silicon oxide, aluminum oxide, titanic oxide, ziruconium oxide, antimony oxide, chromium oxide, germanium oxide, vanadium oxide, tungusten oxide, iron oxide, manganese oxide and cerium oxide. More preferable among these metallic oxides are silicon oxide, aluminum oxide, titanic oxide and cerium oxide. These metallic oxides may be used singly or as a mixture of two or more.

As the particularly favorable inorganic particles used in production methods (A), metallic oxides may be exemplified, such as aluminum oxide, titanic oxide, ziruconium oxide, antimony oxide, chromium oxide, germanium oxide, vanadium oxide, tungusten oxide, iron oxide, manganese oxide and cerium oxide. More preferable among these metallic oxides are aluminum oxide, titanic oxide and cerium oxide. These metallic oxides may be used singly or as a mixture of two or more.

Typically, the inorganic particles to be dispersed are in a form of powder existing as coagula (called "secondary particles") of small particles (called "primary particles"). The average diameter of these primary particles is normally 0.005 to 1 $\mu$m.

2. DISPERSION PROCESS AND EQUIPMENT

Although there is no particular limitation to equipment to be used in the preliminary dispersion process of the production method (A), such equipment that can directly disperse the inorganic particles into an aqueous medium while sucking the inorganic particles is preferable to preliminarily disperse a large quantity of the inorganic particles. Among such equipment is a powder introducer/mixer/disper (e.g., Jet Stream Mixer ("Jet Stream Mixer" is a tread mark) of Mitamura Riken Kogyo Inc.).

To disperse the inorganic particles at a high concentration in the preliminary dispersion process according to the production method (A), equipment having a kneader with planetary motion type mixing blades or a high-speed rotation dispers (blades) is preferable. More preferably, such equipment should have a combination of a kneader in which the planetary motion type mixing blades and high-speed rotation dispers. Among such equipment are Planetary Disper ("Planetary Disper" is a tread mark) of Asada Iron Works Co., Ltd. and T. K. Hibis Disper Mix ("T. K. Hibis Disper Mix" is a tread mark) of Tokushu Kika Kogyo Co., Ltd.

Furthermore, a bead mill may be used in the preliminary dispersion process of the production method (A). The diameter of the beads to be used should be 0.1 to 10 mm, and preferably be 0.2 to 5 mm. If the bead diameter is smaller than 0.1 mm, it will be difficult to separate beads from the aqueous dispersion slurry after production. If the bead diameter is larger than 10 mm, collision of the inorganic particles against the beads will be less frequent, and as a result, not only the dispersion efficiency will drop but also beads may be broken and broken pieces may mix into the aqueous dispersion slurry of inorganic particle.

Among preferable materials of beads are non-alkali glass, alumina, zircon, zirconia, titania and silicon nitride. Preferably, a rotor or vessel (inner cylinder) of the bead mill should be provided with a lining resin, such as polyurethane, to protect the aqueous dispersion slurry from metallic contamination, or a lining of ceramic, such as zirconia, to prevent metallic contamination and increase wear resistance.

The preliminary dispersion process of the production method (A) may be performed for plural times on single equipment or for a single time on plural, different equipment.

The main dispersion process of the production method (A) is performed on equipment, such as a high-pressure homogenizer which pressurizes the dispersion slurry out of the preliminary dispersion process to 100 to 3,000 kg/cm$^2$. Among the high-pressure homogenizers available in the market and applicable to the main dispersion process are Manton Gaulin Homogenizer ("Manton Gaulin Homogenizer" is a tread mark) of Doei Shoji Co., Ltd., Bertoli Homogenizer ("Bertoli Homogenizer" is a tread mark) of Japan Machinery Company, Microfluidizer ("Microfluidizer" is a tread mark) of Mizuho industrial Co., Ltd., Nanomizer ("Nanomizer" is a tread mark) of Tsukishima Kikai Co., Ltd., Genus PY ("Genus PY" is a tread mark) of Genus Co., Ltd., System Organizer ("System Organizer" is a tread mark) of Nippon BEE Co., Ltd., and Ultimaizer ("Ultimaizer" is a tread mark) of Ito Industrial Machine Co., Ltd. Preferable equipment among those named are those which use sintered diamonds or single crystal diamonds for the liquid contacting portions of the dispersion processing unit. This is because if the liquid contacting portions of the dispersion processing equipment is made of ceramic or metal, the orifice will be widened due to wear, the passing liquid pressure will drop, and as a result, dispersion may become incomplete. Furthermore, foreign matters produced by wear will mix into the dispersion slurry, and the purity of the dispersion slurry will drop to such an extent that the purity can not be practically acceptable.

The pressure to be applied by the high-pressure homogenizer or the like should be in a range of 100 to 3,000 kg/cm$^2$, and preferably be in a range of 200 to 2,000 kg/cm$^2$. If such pressure is lower than 100 kg/cm$^2$, dispersion will be incomplete. If such pressure is higher than 3,000 kg/cm$^2$, disadvantageously larger-sized equipment will be required and this will raise the processing cost. In the main dispersion process, the processing on the high-pressure homogenizer may be performed for plural times.

In the production method (B), a kneader which performs a planetary motion, i.e., mixing blades rotate around respective subsidiary spindles and at the same time the subsidiary spindles revolve around a spindle can be used. Such kneader should preferably be equipped with high-speed rotation dispers (blades) as well.

Figure 2A:
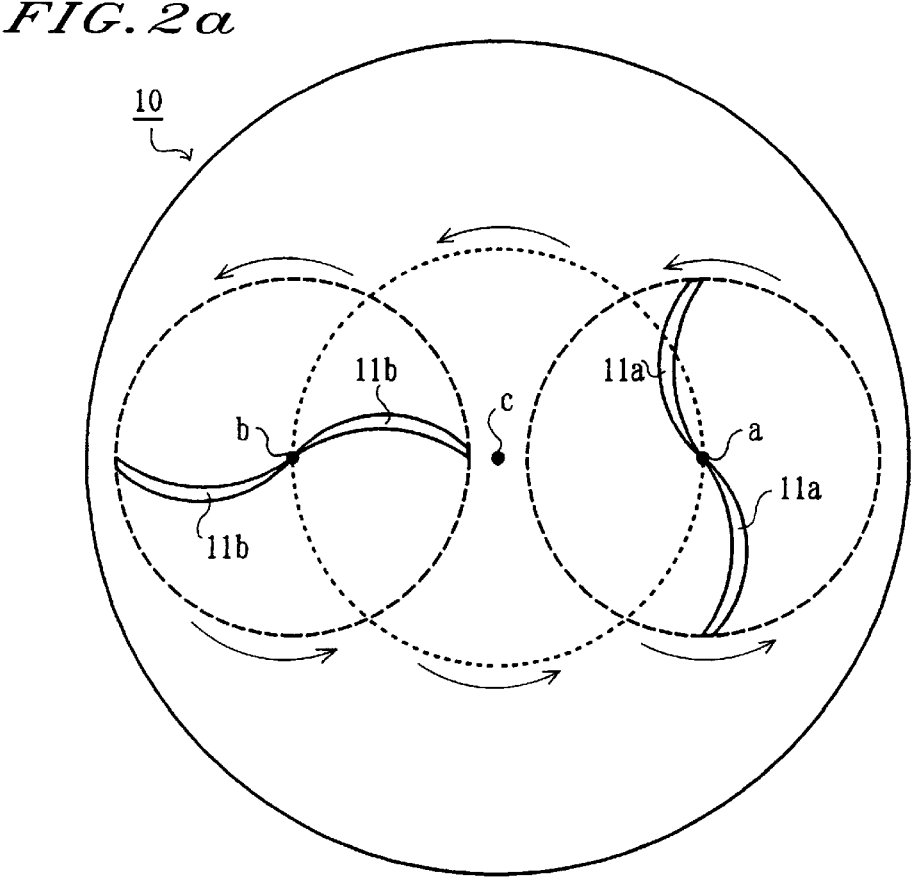
FIG. 2(a) is a top view thereof.
Figure 2B:
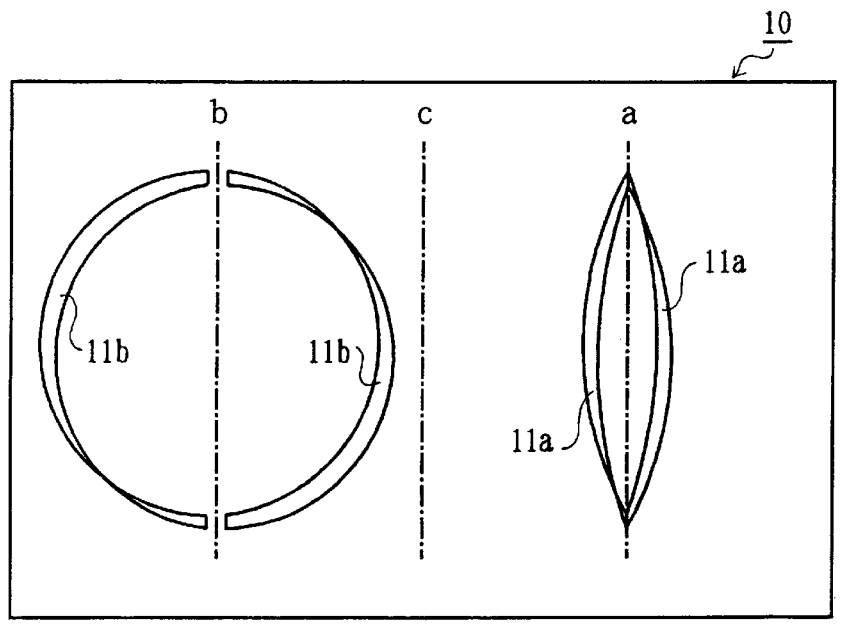
FIG. 2(b) is a side view thereof.

Here, the equipment in which the mixing blades perform the planetary motion will be described. FIG. 2 schematically shows a planetary kneader in which mixing blades performs a planetary motion, wherein FIG. 2(a) is a top view of such planetary kneader, and FIG. 2(b) is a side view of such planetary kneader. A kneading tank 10 of the kneader shown in this figure is provided with a mixing blade 11a which rotates around a subsidiary spindle a in a direction indicated by an arrow, a mixing blade 11b which rotates around a subsidiary spindle b in a direction indicated by an arrow, and a spindle c which revolves these 2 subsidiary spindles a and b in a direction indicated by an arrow. That is, it is so constructed that the mixing blades 11a and 11b "rotate" around the respective subsidiary spindles a and b, while the subsidiary spindles a and b "revolve" around the spindle c.

As the mixing blades 11a and 11b provided as described above move with complicated loci, the dispersion slurry within the kneading tank 10 can be uniformly kneaded and the coagula can be completely divided. As a result, a large quantity of the inorganic particles can be efficiently dispersed in a comparatively small quantity of aqueous medium.

In FIG. 2, 2 subsidiary spindles a and b are shown. However, it is acceptable that single subsidiary spindle is provided or 3 or more subsidiary spindles are provided instead of 2 subsidiary spindles. ,Furthermore, when a plurality of subsidiary spindles are provided, each subsidiary spindle may be positioned at regular intervals or at irregular intervals.

Also in FIG. 2, 2 mixing blades are provided as a pair on each subsidiary spindle. However, it is acceptable that single mixing blade is provided on each subsidiary spindle, or 3 or more mixing blades are provided as a pair on each subsidiary spindle.

It is also acceptable that a high-speed blade is provided on a spindle coaxially with or differently from the subsidiary spindle of the mixing blades to improve the ability of dividing and dispersing the inorganic particles.

In FIG. 2, both the spindle c and the subsidiary spindles a and b rotate counterclockwise viewed from the top. However, it is acceptable that the spindle c and the subsidiary spindles a and b are set differently from each other in the rotational direction to have different loci of the mixing blade motion.

In FIG. 2, the mixing blades 11a and 11b are curved and twisted between the ends (twisted shape). However, it is accepted that the mixing blades 11a and 11b are differently shaped in any way as long as such shape ensures that the dispersion slurry within the kneading tank can be uniformly kneaded and the coagula can be completely divided and as a result a large quantity of the inorganic particles can be efficiently dispersed in a comparatively small quantity of an aqueous medium.

Among those planetary kneaders which satisfy the requirements described above, in addition to those kneaders named above, are Universal Mixer/Stirrer ("Universal Mixer/Stirrer" is a tread mark) of Dalton Co., Ltd., Universal Mixer ("Universal Mixer" is a tread mark) of Powlex Co., Ltd., Planetary Kneader/Mixer ("Planetary Kneader/ Mixer" is a tread mark) of Ashizawa Co., Ltd., T. K. Hibis Disper Mix ("T. K. Hibis Disper Mix" is a tread mark) of Tokushu Kika Kogyo Co., Ltd., and Planetary Disper ("Planetary Disper" is a tread mark) of Asada Iron Works Co., Ltd.

Preferably, the equipment used in the preliminary dispersion process of the production method (A) or in the production method (B) should be provided with a lining of resin, such as polyurethane, Teflon or epoxy resin, to protect the aqueous dispersion slurry from metallic contamination after production. Still preferably, the liquid contacting portions, such as inner walls and mixing blades, of such equipment should be provided with a lining of ceramic, such as zirconia, to prevent metallic contamination and increase wear resistance.

The production method (B) may be performed for plural times on single equipment or one or more times on a combination of plural, different equipment.

3. ADDITION OF ACID OR ALKALI

In the production method (A), an acid or alkali should preferably be added at least to the aqueous medium before the preliminary dispersion process, to the dispersion slurry during the preliminary dispersion process, to the dispersion slurry after the preliminary dispersion process but before the main dispersion process, to the dispersion slurry during the main dispersion process, or to the dispersion slurry after the main dispersion process to adjust the pH of the aqueous dispersion slurry to be finally in a range of 2 to 12. As a result of this addition, the dispersion stability of the resultant aqueous dispersion slurry becomes much higher.

In the production method (B), an acid or an alkali should preferably be added at least to the aqueous medium before the dispersion process, to the dispersion slurry during the dispersion process, or to the dispersion slurry after the dispersion process to adjust the pH of the aqueous dispersion slurry to be finally in a range of 2 to 12. As a result of this addition, the dispersion stability of the resultant aqueous dispersion slurry becomes much higher.

The pH of the aqueous dispersion varies depending on the intended use. However, such pH should preferably be in a range of 3 to 11. If the pH is set to be less than 2 or more than 12, the inorganic particles tends to be dissolved or coagulated due to insufficient colloidal stability.

The acid or the alkali may be added in any one of the stages described above or in any 2 or 3 of such stages. In whatever stage the acid or the alkali is added, preferably, the aqueous medium or dispersion slurry should be continuously stirred while the acid or alkali is added. If the acid or the alkali is added after the dispersion, a part of the inorganic particles of the dispersion slurry may be coagulated due to a shock of localized increase in concentration. To prevent this, it is preferable that the dispersion process should be performed again or high-speed mixing processing should be performed by using a homo-mixer, a disper or the like after the addition of the acid or the alkali.

As acids, inorganic acids, such as hydrochloric acid, nitric acid, sulfuric acid and phosphoric acid, or organic acids, such as acetic acid, phthalic acid, acrylic acid, methacrylic acid, crotonic acid, polyacrylic acid, maleic acid and sorbic acid, may be used. Among of these, hydrochloric acid, nitric acid and acetic acid, which are univalent acids, are preferable. As alkalis, inorganic bases, such as potassium hydroxide, sodium hydroxide, lithium hydroxide and ammonia, and amines, such as ethylenediamine, trirthylamine and piperazine, may be used.

4. PREFERABLE RANGE OF AQUEOUS DISPERSION SLURRY

The average diameter of the inorganic particles of the aqueous dispersion slurry according to the present invention is in a range of 0.01 to 2 $\mu$m, should preferably be in a range of 0.02 to 1 $\mu$m, and should more preferably be in a range of 0.03 to 0.8 $\mu$m. If such diameter is smaller than 0.01 $\mu$m, the viscosity of the aqueous dispersion slurry of the inorganic particles will be excessively high, and good dispersion stability can not be obtained. If such diameter is larger than 2 $\mu$m, the dispersion stability will be so low as to cause sedimentation.

This particle diameter can be controlled by setting a suitable condition in the main dispersion process and/or by selecting a suitable raw material of the inorganic particles. When the high-pressure homogenizer is used, the particle diameter can be controlled by the pressure, number of processing times, etc. of the high-pressure homogenizer. When the planetary kneader is used, the particle diameter can be controlled by the number of rotations of the mixing blades, the number of revolutions of the subsidiary spindles, the mixing time, etc.

The inorganic particles dispersed in the aqueous dispersion slurry obtained by either of the production methods (A) and (B) according to the present invention are composed of primary particles and secondary particles or of secondary particles alone. The average diameter of the inorganic particles can be measured by using Laser Particle Diameter Analysis System Model LPA-3000S/3100, which is controlled based on a dynamic light scattering method, of Otsuka Denshi Co., Ltd.

SPECIFIC DESCRIPTION

Now, the present invention will be specifically described by referring to examples and reference examples. However, the present invention is not limited to such examples.

In the following description, "part" means "part by weight," and "%" means "percent by weight or wt %." The average particle diameter of the inorganic particles in the aqueous dispersion slurry of the inorganic particles were measured by using Laser Particle Diameter Analysis System Model LPA-3000S/3100 of Otsuka Denshi Co., Ltd.

1. PRODUCTION METHOD (A)

EXAMPLE 1

Fumed silica (Aerogil #50 of Nippon Aerosil Co., Ltd.) of 15 kg was preliminarily dispersed in 60 kg of ion exchange water while being sucked by using a powder introducer/mixer/disperser (e.g., Jet Stream Mixer TDS ("Jet Stream Mixer TDS" is a tread mark) of Mitamura Riken Kogyo Inc.).

Then, thus obtained preliminarily dispersed slurry were subjected to the main dispersion processing by using a high-pressure homogenizer provided with a sintered diamond dispersion unit (Microfluidizer ("Microfluidizer" is a tread mark) of Mizuho industrial Co., Ltd.) under a pressure of 800 kg/cm$^2$.

Then, thus obtained dispersion slurry out of the main dispersion processing were added with potassium hydroxide solution of 20% in concentration while being stirred, so that the pH thereof was adjusted to 10.

Then, under the same conditions as those of the main dispersion processing, the processing by using the high-pressure homogenizer was performed again.

The average particle diameter of thus obtained particles in the aqueous dispersion slurry of the fumed silica was 0.25 $\mu$m. The aqueous dispersion slurry were left for 30 days at 25° C., but none of increase in viscosity, gelation or sediment was recognized.

EXAMPLE 2

Fumed alumina (Al$_2$O$_3$—C of Nippon Aerosil Co., Ltd.) of 15 kg and 1.8 kg of 1N nitric acid was preliminarily dispersed in 48.2 kg of ion exchange water while being sucked by using the Jet Stream Mixer TDS ("Jet Stream Mixer TDS" is a tread mark) of Mitamura Riken Kogyo Inc. described above.

Then, thus obtained preliminarily dispersed slurry were subjected to the main dispersion processing by using a high-pressure homogenizer provided with a single crystal diamond dispersion unit (Ultimaizer ("Ultimaizer" is a tread mark) Model HJP-30030 of Sugino Machine Limited) under a pressure of 1,500 kg/cm$^2$.

The pH and average particle diameter of thus obtained particles in the aqueous dispersion slurry were 4.1 and 0.16 µm, respectively. The aqueous dispersion slurry were left for 30 days at 25° C., but none of increase in viscosity, gelation or sediment was recognized.

EXAMPLE 3

Potassium hydroxide solution in which 60 g of potassium hydroxide particles were dissolved in 9 kg of ion exchange water was preliminarily dispersed while being stirred by using a kneader (T. K. Hibis Disper Mix ("T. K. Hibis Disper Mix" is a tread mark) Model HDM-3D-20 of Tokushu Kika Kogyo Co., Ltd.) and continuously adding 5 kg of fumed silica (Aerogil #90 of Nippon Aerosil Co., Ltd.) for 3 hours.

Then, thus obtained preliminarily dispersed slurry were further kneaded for 2 hours, and then added with ion exchange water to dilute the solid concentration to 30%.

Then, thus obtained preliminarily dispersed slurry were subjected to the main dispersion processing by using a high-pressure homogenizer provided with a single crystal diamond dispersion unit (Genus PY Model PRO2-15 of Genus Co., Ltd.) under a pressure of 500 kg/cm$^2$.

The pH and average particle diameter of thus obtained aqueous dispersion slurry of fumed silica were 10 and 0.19 µm, respectively. The aqueous dispersion slurry were left for 30 days at 25° C., but none of increase in viscosity, gelation or sediment was recognized.

EXAMPLE 4

Aqueous dispersion slurry of alumina were obtained by the same method as the example 2 except that instead of using the fumed alumina, metallic vapor deposited alumina (NanoTek ("NanoTek" is a tread mark) of Nanophase Technologies Corporation represented by C. I. Kasei Co., Ltd.) was used.

The pH and average particle diameter of thus obtained aqueous dispersion slurry of alumina were 4.2 and 0.13 µm, respectively. The aqueous dispersion slurry were left for 30 days at 25° C., but gelation or sediment was not recognized.

REFERENCE EXAMPLE 1

Aqueous dispersion slurry of the fumed silica was formulated by the same method as the example 1 except that the main dispersion processing was not performed in the example 1.

Thus obtained aqueous dispersion slurry were left, and after 30 minutes, all the quantity of the aqueous dispersion slurry gelled and completely lost fluidity.

2. PRODUCTION METHOD (B)

EXAMPLE 5

Fumed aluminum oxide C (Degusa Co., Ltd.) of 10 kg was continuously added for 1 hour to 8.6 kg of ion exchange water in which 1.4 kg of 1N nitric acid had been dissolved while the mixture was kneaded by a planetary kneader having liquid contacting portions of the stirrer and container coated with urethane resin (Universal Kneader ("Universal Kneader" is a tread mark) Model 30DM of Dalton Co., Ltd.) with the subsidiary spindles and spindle of the stirrer in rotation at 60 rpm and 20 rpm, respectively. After such addition, the mixture was further kneaded for another 1 hour at 50% solid concentration.

Thus obtained slurry was further dispersed for another 1 hour at 2,000 rpm by using a non-planetary disperser (T. K. Homodisper ("T. K. Homodisper" is a tread mark) of Tokushu Kika Kogyo Co., Ltd.). Thus obtained slurry was diluted with ion exchange water, and aqueous dispersion slurry of aluminum oxide with 30% solid concentration were obtained. Thus obtained aqueous dispersion slurry were subjected to metallic analysis by atomic absorption spectroscopy. As a result, there was a little metallic contamination with 0.5 ppm of iron.

The pH and average particle diameter of the aqueous dispersion slurry of fumed aluminum oxide were 4.3 and 0.12 µm, respectively. The aqueous dispersion slurry were left for 30 days at 25° C., but none of increase in viscosity, gelation or sediment was recognized.

EXAMPLE 6

Fumed titanium dioxide (P25, Nippon Aerosil Co., Ltd.) of 2 kg was continuously added for 1 hour to 2 kg of distilled water in which 100 g of acetic acid had been dissolved while the mixture was kneaded by a planetary kneader having liquid contacting portions of the stirrers and container coated with urethane resin (Universal Kneader ("Universal Kneader" is a tread mark) Model 5DM of Dalton Co., Ltd.) with the subsidiary spindles and spindle of the stirrer in rotation at 90 rpm and 30 rpm, respectively. After such addition, the mixture was further kneaded for another 1 hour at 50% solid concentration.

Thus obtained slurry was diluted with ion exchange water, and aqueous dispersion slurry of titanium dioxide with 40% solid concentration were obtained.

The pH and average particle diameter of thus obtained aqueous dispersion slurry of titanium dioxide were 6.5 and 0.16 µm, respectively. The aqueous dispersion slurry were left for 30 days at 25° C., but none of increase in viscosity, gelation or sediment was recognized.

EXAMPLE 7

Fumed silicon oxide (Aerosil #50 ("Aerosil #50" is a tread mark) of Nippon Aerosil Co., Ltd.) of 6 kg was continuously added for 30 minutes to 8 kg of distilled water in which 60 g of potassium hydroxide granules had been dissolved while the mixture was kneaded by using a planetary kneader having liquid contacting portions of the stirrers and container coated with urethane resin (T. K. Hibis Disper Mix ("T. K. Hibis Disper Mix" is a tread mark) Model HDM-3D-20 of Tokushu Kika Kogyo Co., Ltd.) with the twisted blades rotated around the respective subsidiary spindles and the subsidiary spindle revolved around the spindle at 10 rpm and 30 rpm, respectively.

After such addition, the mixture was further subjected to kneading for another 1 hour at 43% solid concentration while the twisted blades were rotated around the respective subsidiary spindles at 30 rpm and at the same time to disper procesing with the corres type high-speed rotary blades of 80 mm in diameter rotated around the respective subsidiary spindles at 2,000 rpm and the spindle rotated at 10 rpm for both the kneading and disper processing.

Thus obtained slurry was diluted with ion exchange water, and aqueous dispersion slurry of silicon oxide with 30%; solid concentration were obtained.

The pH and average particle diameter of the aqueous dispersion slurry of silicon oxide were 10.5 and 0.23 μm, respectively. The aqueous dispersion slurry were left for 30 days at 25° C., but none of increase in viscosity, gelation or sediment were recognized.

EXAMPLE 8

Aqueous dispersion slurry of silicon oxide were obtained by the same method as the example 7 except that fumed silicon oxide was added to 8 kg of distilled water in which 60 g of potassium hydroxide granules had not been dissolved and then the mixture was subjected to further kneading and disper processing for another 1 hour by using blades and potassium hydroxide was added as 10% solution at 10 minutes before ending such additional processing.

The pH and average particle diameter of the aqueous dispersion slurry of silicon oxide were 10.3 and 0.21 μm, respectively. The aqueous dispersion slurry were left for 30 days at 25° C., but none of increase in viscosity, gelation or sediment were recognized.

REFERENCE EXAMPLE 2 (COMPARISON TO EXAMPLE 7)

Aqueous dispersion slurry were formulated by the same method as the example 7 except that a disperser with the stirrers only in rotation (T. K. Homo Disper ("T. K. Homo Disper" is a tread mark) of Tokushu Kika Kogyo Co., Ltd.) was used as a kneader instead of T. K. Hibis Disper Mix of Tokushu Kika Kogyo Co., Ltd. with the stirrers in both rotation and revolution (planetary mechanism).

Complete dispersion slurry could not be obtained. The pH and average particle diameter of the aqueous dispersion slurry were 10.6 and 2 μm or more, respectively. The aqueous dispersion slurry were left for 2 days at 25° C., and gelled and lost fluidity.

REFERENCE EXAMPLE 3 (COMPARISON TO EXAMPLE 6)

Aqueous dispersion slurry were formulated by the same method as the example 6 except that 6 kg of distilled water in which 100 g acetic acid had been dissolved, instead of 2 kg of distilled water in which 100 g acetic acid had been dissolved, to adjust the solid concentration during kneading to 25%.

Complete dispersion slurry could not be obtained. The pH and average particle diameter of the aqueous dispersion slurry were 6.7 and 2 μm or more, respectively. The aqueous dispersion slurry were left for 2 days at 25° C., and gelled and lost fluidity.

REFERENCE EXAMPLE 4 (COMPARISON TO EXAMPLE 6)

Aqueous dispersion slurry were formulated by the same method as the example 6 except that 0.6 kg of distilled water in which 100 g acetic acid had been dissolved, instead of using 2 kg of distilled water in which 100 g acetic acid had been dissolved, to adjust the solid concentration during kneading to 74%.

During continuous addition of the inorganic particles, the mixer was stopped due to overload, and further continuous kneading operation was impossible.

We claim:

1. A production method for aqueous dispersion slurry of inorganic particles, wherein inorganic particles are dispersed in an aqueous medium to an average particle diameter of 0.01 to 2 μm by using either of a method (A) having a preliminary dispersion process in which said inorganic particles are added to and dispersed in an aqueous medium and a main dispersion process in which seperate streams of dispersed slurry out of said preliminary dispersion process are collided with each other and/or with walls of a container under a pressure of 100 to 3,000 kg/cm$^2$ or a method (B) in which said inorganic particles are added to an aqueous medium within a kneading tank of a kneader in which mixing blades are rotated around respective subsidiary spindles and said subsidiary spindles are revolved around a spindle and dispersed at a solid concentration of 30 to 70 wt %.

2. The production method for aqueous dispersion slurry according to claim 1, wherein said inorganic particles are synthesized by a vapor phase method.

3. The production method for aqueous dispersion slurry according to claim 1, wherein said inorganic particles are synthesized by a fumed method.

4. The production method for aqueous dispersion slurry according to claim 1, wherein said inorganic particles are at least one of silicon oxide, aluminum oxide, titanic oxide and cerium oxide.

5. The production method for aqueous dispersion slurry according to claim 1, wherein an average particle diameter of said inorganic particles dispersed in an aqueous medium is 0.02 to 1 μm.

6. The production method for aqueous dispersion slurry according to claim 1, wherein an average particle diameter of said inorganic particles dispersed in an aqueous medium is 0.03 to 0.8 μm.

7. The production method for aqueous dispersion slurry according to claim 1, wherein at least a part of inorganic particles contacting portions of a disperser used in said preliminary dispersion process of said production method (A) and/or of said kneader used in the production method (B) is provided with a lining of resin.

8. The production method for aqueous dispersion slurry according to claim 1, wherein a disperser used in said preliminary dispersion process of the production method (A) is said kneader used in the production method (B).

* * * * *